(12) United States Patent
Abbott (10) Patent No.: US 7,663,801 B2
(45) Date of Patent: Feb. 16, 2010

(54) MANAGING GAIN TILT IN AN OPTICALLY AMPLIFIED TRANSMISSION SYSTEM

(75) Inventor: Stuart M. Abbott, Marlboro, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 12/183,124

(22) Filed: Jul. 31, 2008

(65) Prior Publication Data

US 2008/0285116 A1 Nov. 20, 2008

Related U.S. Application Data

(62) Division of application No. 11/347,022, filed on Feb. 3, 2006, now Pat. No. 7,440,168.

(51) Int. Cl.
 *H01S 3/00* (2006.01)
(52) U.S. Cl. .................. 359/337; 359/337.4; 398/81
(58) Field of Classification Search .......... 359/337, 359/337.4, 337.1, 337.5; 385/123; 398/198, 398/81
See application file for complete search history.

(56) References Cited

U.S. PATENT DOCUMENTS

| | | | |
|---|---|---|---|
| 6,188,823 B1 * | 2/2001 | Ma .................. | 385/123 |
| 6,782,174 B1 * | 8/2004 | Gleason et al. ....... | 385/123 |
| 2002/0080447 A1 * | 6/2002 | Fells et al. ............. | 359/141 |
| 2004/0156605 A1 * | 8/2004 | Gleason et al. ....... | 385/123 |

* cited by examiner

*Primary Examiner*—Mark Hellner
(74) *Attorney, Agent, or Firm*—Grossman, Tucker, Perreault & Pfleger, PLLC (57) ABSTRACT

A method of managing gain tilt in an optical transmission segment including providing an optical transmission segment having a plurality of fiber optic cable spans and a plurality of repeaters coupled to the fiber optic cable spans. Gain tilt in the optical transmission segment is monitored. If negative gain tilt is accumulated at a repeater location in the transmission segment, the repeater at the repeater location is replaced with a higher gain repeater having a higher nominal gain value than the nominal gain value of the repeater being replaced.

6 Claims, 5 Drawing Sheets

MANAGING GAIN TILT IN AN OPTICALLY AMPLIFIED TRANSMISSION SYSTEM

CROSS-REFERENCE TO RELATED APPLICATIONS

The present application is a divisional of U.S. patent application Ser. No. 11/347,022, filed, Feb. 03, 2006 the teachings of which are hereby incorporated herein by reference.

TECHNICAL FIELD

The present invention generally relates to optical telecommunications. More specifically, the present invention relates to managing gain tilt in an optically amplified transmission system by using a combination of optical amplifiers having different gain values.

BACKGROUND

Optical transmission systems, such as long-haul undersea optical transmission systems, may be used to transmit optical signals over long distances. These long-haul optical transmission systems, however, suffer from signal degradation caused by many factors, for example, losses due to thermal noise and scattering caused by optical fiber imperfections as well as losses resulting from splicing during assembly. These and other factors combine to attenuate the optical signal propagating through the transmission system.

To address this problem, optical signals are optically amplified at predetermined locations along the transmission system. Optical transmission systems may include repeaters connected to lengths of fiber optic cable. The repeaters may include optical amplifiers for amplifying optical signals transmitted in each direction in the transmission system. A repeater together with a length of fiber optic cable generally forms a transmission span, and multiple transmission spans form an optical transmission segment. A system may be designed such that the amplification provided by each repeater (i.e., the repeater gain) compensates for the signal loss in the preceding transmission span (i.e., span loss).

In existing optimal transmission segment designs, all of the spans are generally designed to have the same nominal values with respect to gain, gain shape and noise contribution. For example, all amplifiers may be identical and all cable lengths have the same nominal loss. The repeaters may be designed to yield a flat gain across a given wavelength range for each transmission span. In existing optimized transmission segments, therefore, the nominal gain of each repeater is ideally equal to the nominal loss of each cable length to provide a net gain of about zero.

To reduce cost in traditional undersea optical transmission systems, repeaters were custom designed to support the longest possible repeater spacing consistent with performance and capacity requirements for the proposed transmission segment. One result of this approach has been the proliferation of repeater gain codes, with each new transmission segment design resulting in a new gain code that is optimized for that particular segment design. More recently, transmission systems have been constructed to make efficient use of existing inventory to meet customer capacity, schedule and performance requirements. When using inventory repeaters, however, the resulting segment designs may be suboptimal, either in repeater count or in segment gain shape.

Imbalances between repeater gain and span loss have been a problem in systems built from repeaters in inventory with stretched repeater spacing as well as in new systems despite best efforts to match repeater gain and span loss. During system assembly, for example, uncertainty in splicing losses and the need to accommodate cables with losses different than the nominal design loss can result in net gains significantly offset from the ideal zero net gain for a transmission system. Imbalances may also be caused by losses added during system repairs, for example, by adding extra cable and splices.

The imbalance between repeater gain and span loss may detrimentally affect the optical signal quality. In particular, when the span losses in the assembled transmission spans exceed the repeater gain, negative gain tilt may occur. As used herein, gain tilt is the difference (e.g., in dB) between the highest channel power and the lowest channel power for a given wavelength range. Negative gain tilt may adversely affect the optical signal to noise ratio (OSNR) of the communication system, may consume dynamic range in pre-emphasis, and may compromise the operation of a line monitoring system (LMS).

One solution to this problem includes monitoring gain tilt and managing gain tilt by adding line build-out attenuators (LBOs) to the optical path in couplings or joints or by adding tilt filters in a gain equalization joint (GEJ) as needed to maintain system gain tilt within acceptable limits. A LBO may be added when the measured gain tilt is positive and a GEJ may be added when the measured gain tilt is negative. When a GEJ is added, the cable span between repeaters may need to be shortened to compensate for the span loss resulting from the insertion of the GEJ itself. Alternatively, when a GEJ is inserted into a nominal loss span, loss is added to the span loss, which introduces negative gain tilt. Thus, adding a GEJ to a transmission system adds loss, which degrades OSNR, and increases cost.

Accordingly, there is a need for a method of managing gain tilt in an optically amplified transmission system using a limited number of non-optimum repeaters. There is also a need for simplified design and manufacturing of an optical communication system using a limited number of repeater codes.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
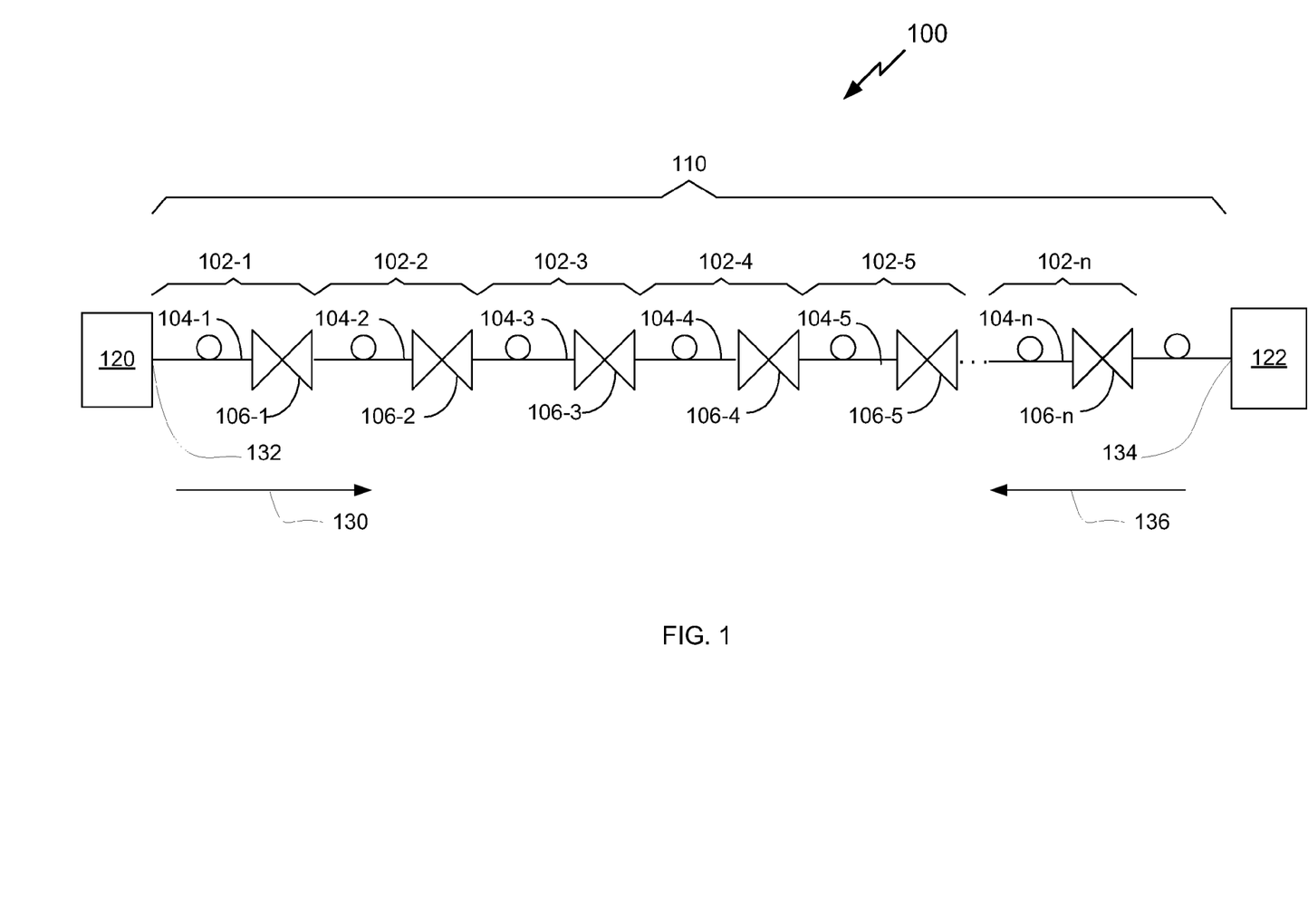
FIG. 1 is a schematic diagram of an optical transmission system in which gain tilt is managed, consistent with one embodiment of the present invention.

Referring to FIG. 1, an optical transmission system 100, consistent with one embodiment of the present invention, is described in greater detail. In general, the optical transmission system 100 may include a combination of optical amplifiers or repeaters having different gain values, which are arranged to manage gain tilt in the system. The concepts described herein may be used to manage gain tilt in a new transmission system being assembled or in the repair of an existing transmission system. The transmission system 100 and concepts described herein may be implemented in optical communications systems known to those skilled in the art, such as long-haul wavelength division multiplexing (WDM) and dense wavelength division multiplexing (DWDM) systems.

One embodiment of the optical transmission system 100 may include a series of transmission spans 102-1 to 102-n, each including a fiber optic cable span 104-1 to 104-n coupled to a repeater 106-1 to 106-n. Multiple transmission spans 102-1 to 102-n may be coupled together to form a transmission segment 110. Each of the cable spans 104-1 to 104-n may include one or more optical fibers for transmitting optical signals and each of the repeaters 106-1 to 106-n may include one or more optical amplifiers for amplifying the transmitted optical signals. In one embodiment where the optical transmission system 100 provides bi-directional transmission, each of the cable spans 104-1 to 104-n includes at least two optical fiber spans for transmitting optical signals in each direction and each of the repeaters 106-1 to 106-n includes at least two optical amplifiers for amplifying the signals transmitted in each direction respectively on the fiber spans. The optical transmission system 100 may also include transmitter/receiver terminals 120, 122 for transmitting and/or receiving the optical signals.

Although the exemplary embodiments are described in the context of a bi-directional transmission system, those skilled in the art will recognize that the concepts described herein may also be applied to a unidirectional transmission system including optical fiber or cable spans and optical amplifiers or repeaters for transmitting and amplifying optical signals in one direction. It is to be understood that a system and method consistent with the invention may be incorporated into a wide variety of network components and configurations. The illustrated exemplary embodiments herein are provided only by way of explanation, not of limitation.

The transmission segment 110 may be designed with uniform repeater spacing (i.e., uniform lengths of cable spans 104-1 to 104-n) and with a mix of different types of repeaters 106-1 to 106-n having different gain values. Each of the transmission spans 102-1 to 102-n may have a nominal span loss value (L) based on, for example, the type of optical fiber used in the cable, the length of the cable span, and splices. Each of the repeaters 106-1 to 106-n may have either a relatively higher nominal gain value ($G_H$) or a relatively lower nominal gain value ($G_L$) lower than the higher nominal gain value. A repeater with the higher nominal gain value ($G_H$) is referred to as a higher gain repeater and a repeater with the lower nominal gain value ($G_L$) is referred to as a lower gain repeater. As used herein, "nominal" means a designated or theoretical amount that may vary from the actual amount. Transmission spans and repeaters may be designed with nominal loss and gain values, respectively, but the actual loss and gain values may vary from the nominal values, as will be understood by those skilled in the art.

The nominal span loss value (L) may be generally the same for each of the transmission spans 102-1 to 102-n in a given transmission segment 110. In one embodiment, the higher nominal gain value ($G_H$) of the higher gain repeaters may be higher than the nominal span loss value (L) and the lower nominal gain value ($G_L$) of the lower gain repeaters may be lower than the nominal span loss value (L). In another embodiment, the higher nominal gain value ($G_H$) of the higher gain repeaters may be higher than the nominal span loss value (L) and the lower nominal gain value ($G_L$) of the lower gain repeaters may be about the same as the nominal span loss value (L).

The transmission segment 110 may include a mix of higher gain repeaters and lower gain repeaters selected and arranged such that the accumulated loss of the transmission segment 110 over several transmission spans 102-1 to 102-n approximately matches the accumulated nominal gains of the repeaters 106-1 to 106-n in those transmission spans 102-1 to 102-n. In a transmission segment 110, an optical path starts at an input of the segment 110 and ends at the output of the segment 110. For an optical signal moving in the direction of arrow 130, for example, the optical path starts at an input at a first end 132 of the segment 110 and ends at an output at a second end 134 of the segment. For an optical signal moving in the opposite direction of arrow 136, the optical path starts at an input at the second end 134 of the segment 110 and ends at an output at the first end 132 of the segment 110.

The net gain ($G_N$) of the optical path may be defined at each point along the length of the optical path or segment 110. At a given point in the optical path, the net gain ($G_N$) is the sum of the cabled fiber losses (L) and the nominal gains ($G_L$, $G_H$) of the repeaters 106-1 to 106-n between the input of the optical path and that given point. Using the values of the net gain ($G_N$) at the outputs of the repeaters 106-1 to 106-n, a gain vector $G_N = [G_{N1}, G_{N2}, G_{N3}, \ldots G_{Nn}]$ may be defined, where:

$$G_{Ni} = \sum_{k=1}^{i} G_k + \sum_{k=1}^{i} L_k$$

and $G_k$ is the nominal gain of repeater k and $L_k$ is the loss of the cable span k. The amount by which the net gain $G_N$ varies above and/or below zero at points along the optical path is referred to as gain excursion.

The repeaters with the nominal gains $G_H$ and $G_L$ may be arranged in the transmission segment 110 such that the gain vector $G_N$ stays within a predetermined acceptable gain excursion (e.g., close to zero), with a bias toward positive values for the net gains $G_{Ni}$ at the output of each of the repeaters 106-1 to 106-n. This design principle may be illustrated using the transmission segment 110 shown in FIG. 1. According to one arrangement, the first three repeaters 106-1, 106-2, 106-3 may have the higher gain value ($G_H$), the fourth repeater 106-4 may have the lower gain value ($G_L$) and the fifth repeater 106-5 may have the higher gain value ($G_H$). If the repeaters are optimally arranged in this exemplary design, the net gains ($G_{N1}$, $G_{N2}$, $G_{N3}$) at the output of the first three repeaters 106-1, 106-2, 106-3 would be positive and the net gain ($G_{N4}$) at the output of the fourth repeater 106-4 would be zero or negative. According to an alternative arrangement, the fourth repeater 106-4 may have the higher gain value ($G_H$) and the fifth repeater 106-5 may have the lower gain value ($G_L$). If the net gains ($G_{N1}$, $G_{N2}$, $G_{N3}$, $G_{N4}$, $G_{N5}$) at the outputs of all five repeaters 106-1 to 106-5 are positive in this alternative arrangement, one skilled in the art will recognize that a lower gain repeater should have been used earlier in the segment 110 to maintain the net gain closer to zero.

Three different exemplary segment designs are considered to further illustrate how the repeaters having the higher and lower gain values may be arranged to manage gain tilt and to optimize the optical path. In these exemplary designs, the length of the transmission segment 110 is about 3150 km, the nominal span length is about 105 km, the nominal span loss is about 22 dB, the number of repeaters is thirty (30), and the repeater gain values (or codes) are about 18 dB ($G_L$) and 23 dB ($G_H$). Table 1 illustrates the net gain vectors of the three different segment designs identified as Cases 1-3.

TABLE 1

| Repeater Position | Case 1 | | Case 2 | | Case 3 | |
|---|---|---|---|---|---|---|
| | Nominal Repeater Gain | Net Gain | Nominal Repeater Gain | Net Gain | Nominal Repeater Gain | Net Gain |
| 1 | 23 | 1 | 23 | 1 | 23 | 1 |
| 2 | 23 | 2 | 23 | 2 | 23 | 2 |
| 3 | 23 | 3 | 18 | -2 | 23 | 3 |
| 4 | 23 | 4 | 23 | -1 | 18 | -1 |
| 5 | 18 | 0 | 23 | 0 | 23 | 0 |
| 6 | 23 | 1 | 23 | 1 | 23 | 1 |
| 7 | 23 | 2 | 23 | 2 | 23 | 2 |
| 8 | 23 | 3 | 18 | -2 | 23 | 3 |
| 9 | 23 | 4 | 23 | -1 | 23 | 4 |
| 10 | 18 | 0 | 23 | 0 | 18 | 0 |
| 11 | 23 | 1 | 23 | 1 | 23 | 1 |
| 12 | 23 | 2 | 23 | 2 | 23 | 2 |
| 13 | 23 | 3 | 18 | -2 | 23 | 3 |
| 14 | 23 | 4 | 23 | -1 | 23 | 4 |
| 15 | 18 | 0 | 23 | 0 | 23 | 5 |
| 16 | 23 | 1 | 23 | 1 | 18 | 1 |
| 17 | 23 | 2 | 23 | 2 | 23 | 2 |
| 18 | 23 | 3 | 18 | -2 | 23 | 3 |
| 19 | 23 | 4 | 23 | -1 | 23 | 4 |
| 20 | 18 | 0 | 23 | 0 | 23 | 5 |
| 21 | 23 | 1 | 23 | 1 | 23 | 6 |
| 22 | 23 | 2 | 23 | 2 | 18 | 2 |
| 23 | 23 | 3 | 18 | -2 | 23 | 3 |
| 24 | 23 | 4 | 23 | -1 | 23 | 4 |
| 25 | 18 | 0 | 23 | 0 | 23 | 5 |
| 26 | 23 | 1 | 23 | 1 | 23 | 6 |
| 27 | 23 | 2 | 23 | 2 | 23 | 7 |
| 28 | 23 | 3 | 18 | -2 | 18 | 3 |
| 29 | 23 | 4 | 23 | -1 | 23 | 4 |
| 30 | 18 | 0 | 23 | 0 | 23 | 5 |

In Case 1 and Case 2, every fifth repeater has a lower gain value (i.e., 18 dB). In Case 2, the first lower gain repeater is in location three (3) whereas in Case 1, the first lower gain repeater is in location five (5). Case 2 is better optimized because the maximum excursion of net gain from zero (i.e., gain excursion) is smaller and because the net gain vector is the same from both ends of the segment. In Case 1, the net gain is always zero or positive in the direction from the repeater at location one (1) to the repeater at location thirty (30), but in the opposite direction, the net gain is always zero or negative because the gain of the first repeater in location thirty (30) is 4 dB lower than the span loss.

Case 3 illustrates a less optimal design where there are five higher gain repeaters followed by one low gain repeater. In the less optimal design of Case 3, the net gain is always positive and grows to a high value (i.e., 7 dB), as compared to the maximum net gain of 2 dB for Case 2. Thus, the gain excursion in Case 3 is higher than the gain excursion in Case 2. The net gain of 2 dB in Case 2 results in 1 dB positive gain tilt in 28 nm.

While some exemplary embodiments may presently be described, a person of ordinary skill in the art will appreciate that other embodiments may be possible having different lengths of cable, different numbers of repeaters and/or different placements of repeaters. A person of ordinary skill in the art will also appreciate that other nominal loss values and nominal gain values and combinations of repeater gains and optical fiber span losses may be possible. Although the segments described above use two different repeater types with two nominal gain values, other repeater types with other gain values (e.g., a medium gain repeater) may also be used in the segments.

Nearly optimal transmission segments of different lengths may be designed from a relatively small set of repeater types (e.g., higher gain repeaters and lower gain repeaters). The use of higher gain repeaters and lower gain repeaters allows a number of advantages during the life cycle of the transmission system. During system assembly, the gain tilt may be managed by changing a repeater type at a location to a repeater type that brings the net gain back toward zero. If negative gain tilt is accumulated, for example, a lower gain repeater may be replaced with a higher gain repeater. With an inventory of higher gain repeaters and lower gain repeaters, gain tilt may be managed without having to add GEJs and without having to add additional loss to the optical path, thereby preserving OSNR.

The use of higher gain repeaters and lower gain repeaters also provides advantages from the standpoint of spare repeaters and system repair. If the higher gain repeaters having gain higher than the nominal span loss are used as the spare repeaters, the higher gain may compensate for some or all of the loss added to the system by the repair operation (e.g., extra cable and splices). This may reduce or eliminate the need for additional repeaters in the repaired system to preserve acceptable gain shape and OSNR. Using higher gain and lower gain repeaters to manage gain tilt may also minimize the number of repeater types needed in inventory, thereby simplifying repeater manufacturing and support. Further, the use of different repeater types to manage gain tilt facilitates system design using repeaters from multiple suppliers.

According to one method of designing and constructing an optical transmission segment, consistent with the present invention, a repeater spacing (or nominal span length) is determined for the segment to achieve the desired system transmission performance (e.g., the OSNR, gain shape, path average power and Q factor). The repeater spacing may be determined by considering the repeater spacing in a system where each of the repeaters has a nominal gain that matches the span loss. As described in greater detail below, computer simulations may be performed to determine the repeater spacing or nominal span length using matched repeaters (i.e., nominal gain=span loss). Those skilled in the art will recognize that a number of different methods may be used to determine the repeater spacing or nominal span length for an optical transmission segment. The nominal span loss may be determined based on the nominal span length and other factors such as the type of fiber and the splices in the span.

The repeaters may then be coupled to the cable spans having the chosen span length and arranged such that a net gain in the segment varies above and below zero net gain within a predetermined acceptable net gain excursion, as described above. A repeater may be chosen from higher gain repeaters and lower gain repeaters and assigned to each location in the transmission segment such that the accumulated loss of the cable over several spans approximates the accumulated nominal gains of the repeaters in those spans. The higher gain repeaters and lower gain repeaters may be designed and/or selected based on the nominal span loss corresponding to the chosen repeater spacing or span length. For example, the higher gain repeaters may have a nominal gain value higher than the nominal span loss value and the lower gain repeaters may have a nominal gain value lower than the nominal span loss value.

Alternatively, the repeater spacing may be determined based on the nominal gain values of the repeaters that are available (e.g., inventory repeaters) for use in the optical transmission segment being constructed. For example, the repeater spacing or nominal span length may be chosen such that the nominal span loss is higher than the gain of some of the available repeaters and lower than the gain of other available repeaters.

A wide range of transmission segment lengths may be constructed using only a few repeater codes (i.e., repeater nominal gain values). One embodiment of the method uses a combination of higher gain repeaters and lower gain repeaters, equal in number to the repeaters in a system that uses only one repeater code optimized for the specific segment length, capacity and fiber type. The higher gain repeaters and lower gain repeaters may be combined and arranged such that the accumulation of net gain (i.e., repeater gain minus span loss) is managed to allow an acceptable net gain excursion that is unlikely to have a significant impact on system performance. As shown in the exemplary systems and simulations discussed below, net gain excursions of less than about 10 dB may not cause a significant penalty.

As described below in connection with exemplary designs for an optical transmission system, computer simulations may be used to determine repeater spacing (or span length) and to evaluate different arrangements of repeaters. The simulations may be performed using existing optical communication system simulators known to those skilled in the art.

Figure 2:
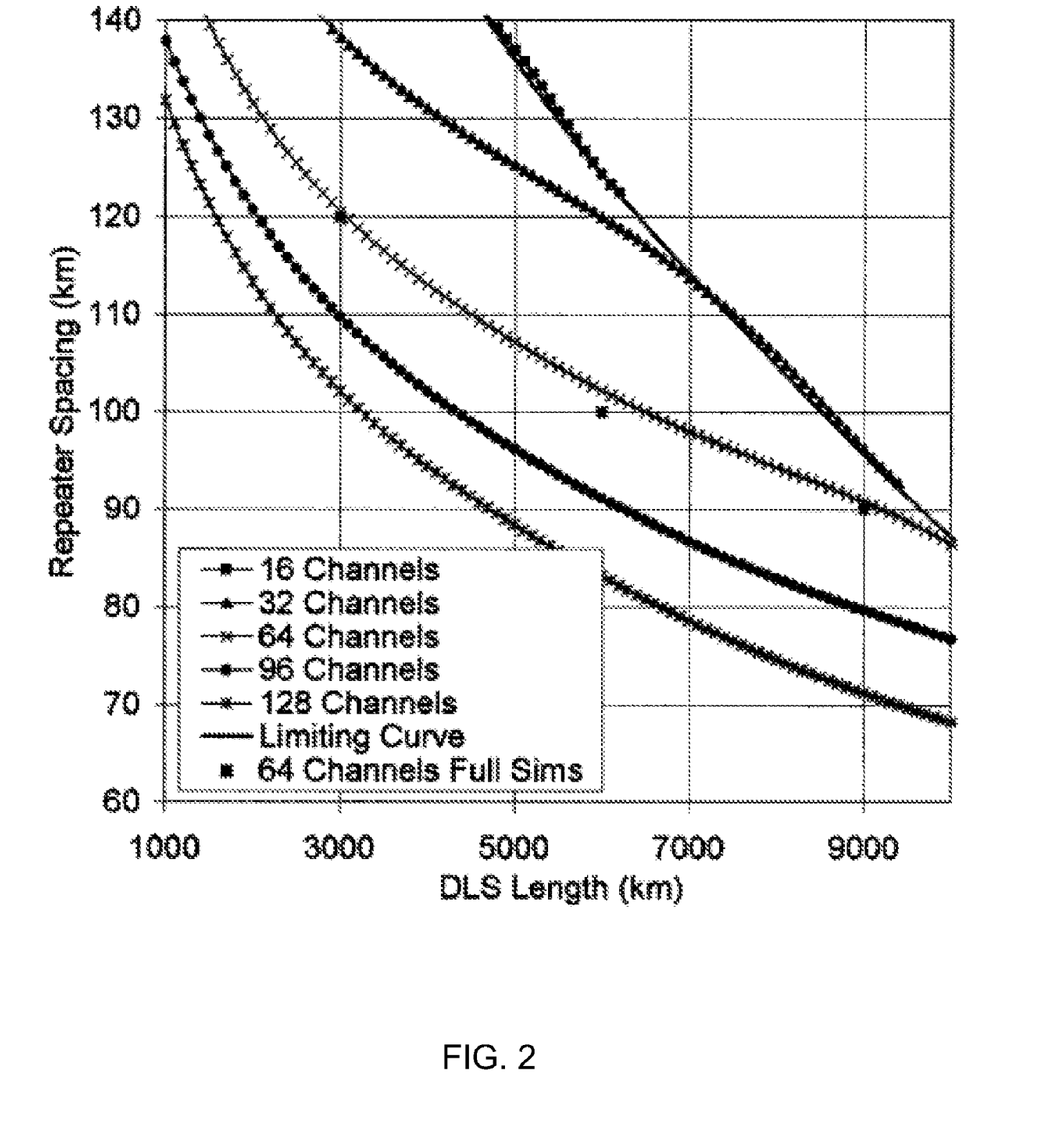
FIG. 2 is a graph illustrating the optimal repeater spacing versus transmission segment length based on exemplary computer simulations for one embodiment of an optical transmission system using dispersion slope managed fiber (DSMF).
Figure 3:
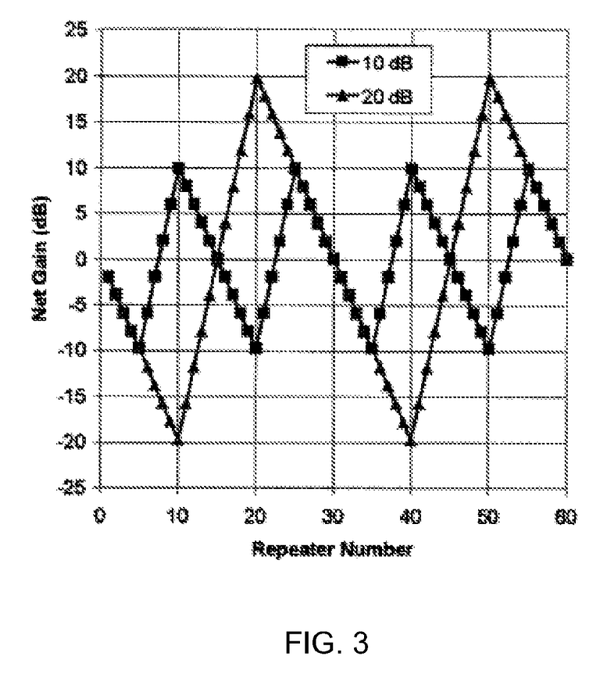
FIG. 3 is a graph illustrating net gain versus repeater position for different arrangements of higher gain repeaters and lower gain repeaters in an optical transmission system using dispersion slope managed fiber (DSMF).
Figure 4:
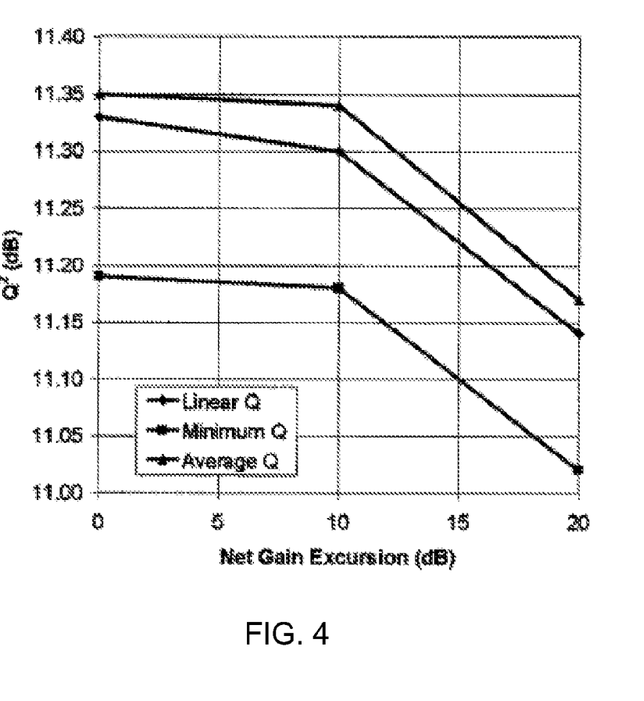
FIG. 4 is a graph illustrating the effects of different net gain excursions on the performance of the exemplary embodiments of the optical transmission system using dispersion slope managed fiber (DSMF).

FIGS. 2-4 illustrate simulation results for one example of a transmission system using transmission spans including dispersion slope managed fiber (DSMF), specifically Allwave® single-mode (SM) fiber and TrueWave® inverse dispersion fiber (IDF) available from OFS. The Allwave® SM fiber has an attenuation of about 0.184 dB/km, an attenuation slope of about −0.00017 dB/km/nm, a dispersion at 1550 nm of about 16.8 ps/nm/km, and a dispersion slop of about 0.057 ps/nm². The TrueWave® IDF fiber has an attenuation value of about 0.234 dB/km, an attenuation slope of about −0.00049 dB/km/nm, a dispersion at 1550 nm of −44.0 ps/nm/km, and a dispersion slop of about −0.120 ps/nm².

The fiber mix in the DSMF transmission spans may be approximately 70% Allwave fiber and 30% IDF fiber with an average fiber attenuation (excluding splice loss) of about 0.199 dB/km and an average dispersion of about −1.5 ps/nm/km. A compensation span including only Allwave fiber may follow every ten transmission spans and may include a gain shape correction filter to correct for accumulated gain shape resulting from uncorrected repeater gain shape. In this example, the span loss budget may include 0.6 dB for cover-to-cable splices and 0.3 dB for the mid-span Allwave-IDF splice and 0.4 dB for unplanned splices, one every 30 km, each splice having a loss of 0.1 dB. With the assumed fiber properties in this example, the average span loss (averaged over 11 spans in one period of a dispersion map) is about 25.1 dB for 120 km transmission spans and is reduced by 1 dB for every 5 km reduction in the span length.

In this exemplary simulation, narrow-bandwidth repeaters, with no gain flattening filters, are assumed and the available repeater bandwidth may be about 18 nm. A maximum repeater power of 15.5 dBm is assumed and the repeaters may have a noise figure of about 4.5 dB. During the exemplary simulation, the system is loaded with 64 channels at 33.33 GHz channel spacing and a line rate of 11.5 Gbits/s is assumed for transmission. The exemplary simulation uses OOK (On/Off Key) modulation, full AM (100% modulation depth) and no phase modulation. The exemplary simulation uses fifteen channels, in clusters of 5, at the two edges and the center of the transmission band, to determine the overall performance of the exemplary segment.

Based on this exemplary system and simulation, the optimal repeater spacing is determined to be the spacing that provides the lowest repeater count to support 64 channels over digital line segments (DLSs) of varying lengths. As shown in FIG. 2, the optimal repeater spacings in this exemplary system are, respectively, 120 km, 100 km, and 90 km for DLS lengths of 3000 km, 6000 km and 9000 km. This determination of the optimal repeater spacing assumes that, for a given DLS, the repeater spacing and repeater gain is the same throughout the system. FIG. 2 also shows the repeater spacing as a function of DLS length to support 16, 32, 64, 96 and 128 channels. These simulation results indicate that a repeater spacing of 90 km or longer may be used to support 64 channels over a DLS that is no longer than 9000 km with the above exemplary fiber characteristics. Maintaining the repeater spacing below 120 km may keep multi-path impairments to a tolerable level.

According to this exemplary simulation, an arrangement of repeaters is determined and evaluated for a 6000 km DLS using 100 km spans. If a 6000 km DLS using 100 km spans is constructed using previous techniques matching repeater gain to span loss, 60 matching repeaters may be used, each having a gain of 21.2 dB and corresponding to a 100 km fiber span. Consistent with the present invention, each of the matching repeaters in such a 6000 km system may be replaced with either a lower gain repeater having a nominal lower gain value ($G_L$) of about 19.2 dB or a higher gain repeater having a nominal higher gain value ($G_H$) of about 25.1 dB. In this example, the lower nominal gain of 19.2 dB generally corresponds to the span loss in a 90 km span and the higher nominal gain of 25.1 dB generally corresponds to the span loss of a 120 km span.

FIG. 3 shows the net gain excursion for two exemplary 6000 km DLS constructions consistent with the present invention. In a 10 dB net gain excursion construction, the first five repeaters were replaced with the lower gain repeaters (i.e., 19.2 dB) resulting in a net gain after the fifth repeater close to about −10 dB and the next five repeaters are replaced with higher gain repeaters (i.e., 25.1 dB) resulting in the net gain after the fifth repeater of about 10 dB. This may be continued for fifteen spans maintaining a net gain excursion of about 10 dB. In a 20 dB net gain excursion construction, the lower gain repeaters and higher gain repeaters are arranged to maintain a net gain excursion of about 20 dB.

FIG. 4 shows the system performance Q as a function of the net gain excursion, including the linear Q (same for all channels in the band) which is based on noise accumulation in the chain of repeaters and the minimum and average Q of the simulated channels. This plot indicates that the exemplary system is tolerant to relatively large accumulated net gain with no significant gain penalty for net gain excursions of 10 dB and only 0.2 dB penalty for a net gain excursion of 20 dB.

Figure 5:
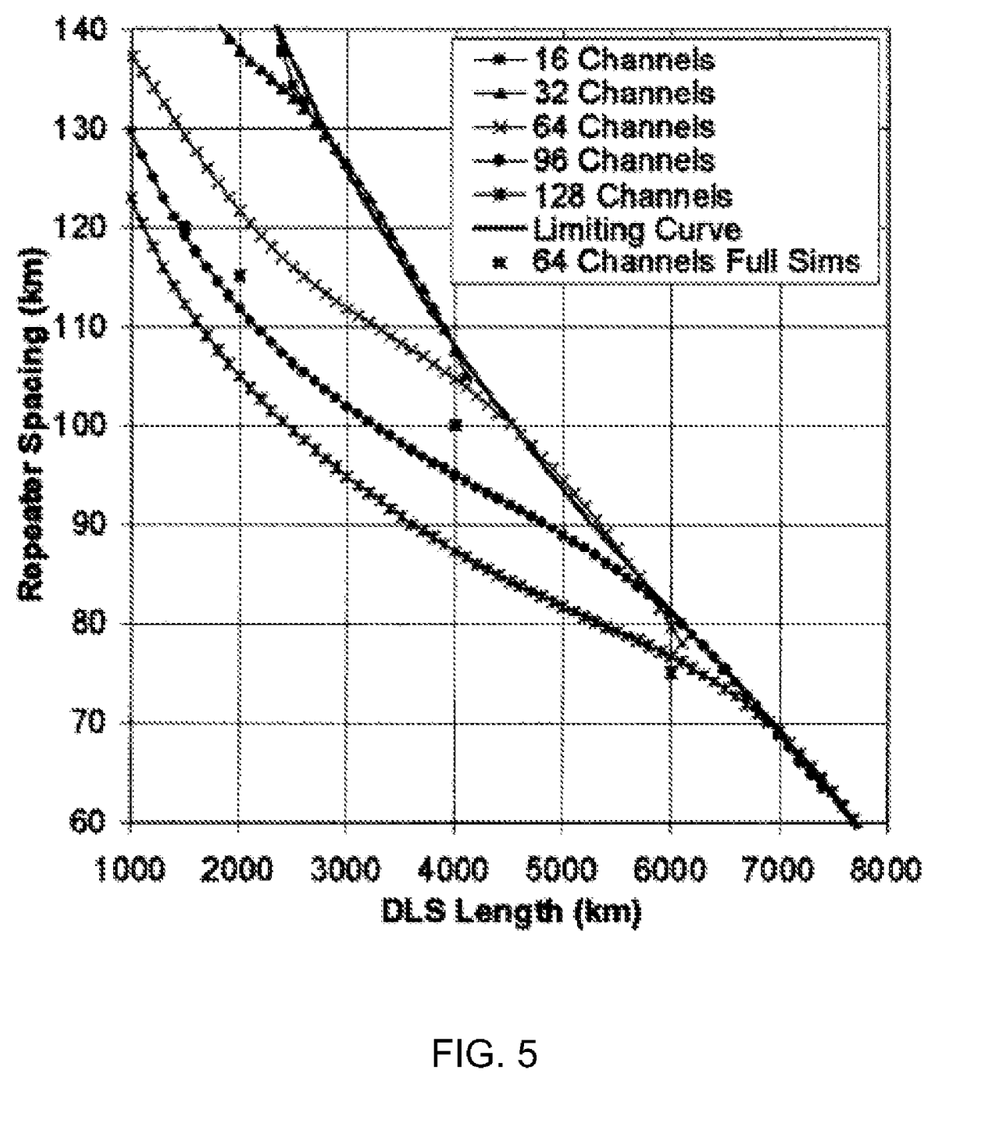
FIG. 5 is a graph illustrating the optimal repeater spacing versus segment length based on exemplary computer simulations for one embodiment of an optical transmission system using non-slope-managed fiber types.
Figure 6:
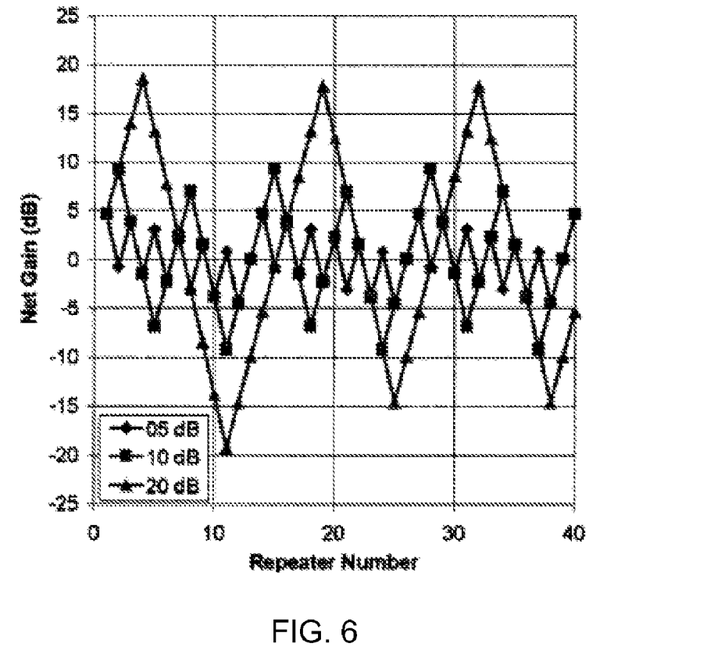
FIG. 6 is a graph illustrating net gain versus repeater position for different arrangements of higher gain repeaters and lower gain repeaters in an optical transmission system using non-slope-managed fiber types.
Figure 7:
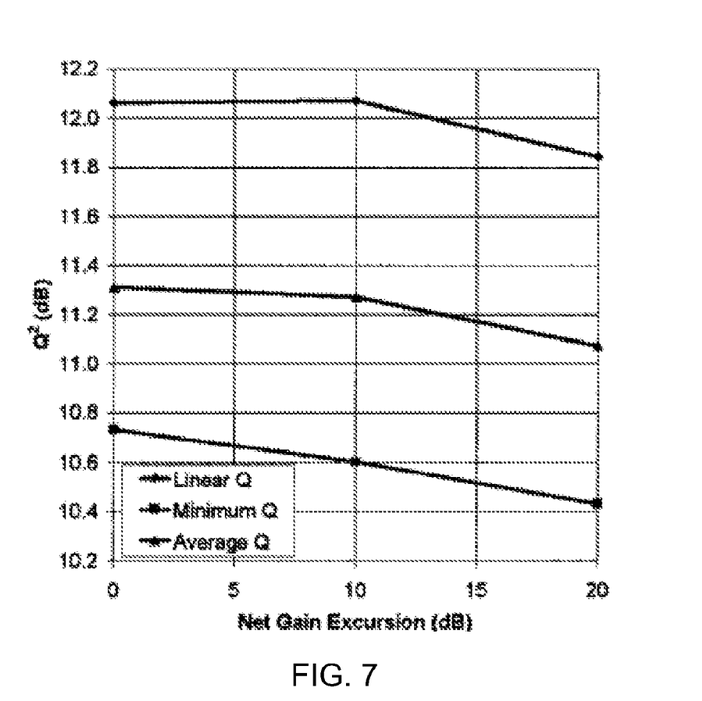
FIG. 7 is a graph illustrating the effects of different net gain excursions on the performance of the exemplary embodiments of the optical transmission system using non-slope-managed fiber types.

FIGS. 5-7 illustrate simulation results for another example of a transmission system using transmission spans including non-slope-managed fiber types, specifically TrueWave-XL® large mode fiber (LMF) and RX® non-dispersion shifted fiber (NDSF) fiber available from OFS. In this example, the transmission spans are purely LMF and are compensated periodically with NDSF fiber. The LMF fiber has an attenuation of about 0.214 dB/km, an attenuation slope of about −0.00022 dB/km/nm, a dispersion at 1550 nm of about −2.8 ps/nm/km, and a dispersion slop of about 0.111 ps/nm². The NDSF fiber has an attenuation value of about 0.196 dB/km, an attenuation slope of about −0.00017 dB/km/nm, a dispersion at 1550 nm of 16.8 ps/nm/km, and a dispersion slop of about 0.057 ps/nm 2. The other assumptions for the simulation are the same as described above for the DSMF system design.

FIG. 5 shows the optimal repeater spacing as a function of the DLS length. The simulation results indicate that the optimal repeater spacings are 120 km, 115 km, 100 km and 75 km for DLSs of lengths 1500 km, 2000 km, 4000 km and 6000 km, respectively. The dark line shows the nonlinear limit, beyond which the system performance is severely penalized by nonlinear impairments.

According to this exemplary simulation, an arrangement of repeaters is determined and evaluated for a 4000 km DLS. If a 4000 km DLS is constructed using matching repeaters, a repeater spacing of 100 km corresponding to a 22.3 dB span is optimal to support 64 channels. Consistent with the present invention, a combination of higher gain repeaters with a nominal gain value of 26.9 dB and lower gain repeaters with a nominal gain value of 16.9 dB may be used in the 4000 km DLS having the repeater spacing of 100 km. In this example, the higher nominal gain of 26.9 dB corresponds to the nominal span loss of a 120 km LMF-NDSF span and the lower nominal gain of 16.9 dB corresponds to the nominal span loss of a 75 km LMF-NDSF span.

FIG. 6 shows the net gain maps for three exemplary 4000 km DLS constructions providing net gain excursions of 5 dB, 10 dB and 20 dB. FIG. 7 shows the simulated system performance as a function of the net gain excursion for this exemplary LMF-NDSF system. As with the exemplary DSMF system discussed above, the simulation results indicate that an insignificant Q penalty is incurred with the use of two repeaters having two different gain values (or codes) to replace a single repeater having one optimal gain value, especially if the maximum net gain excursion is maintained below 10 dB.

While the exemplary embodiments described above illustrate substantially periodic arrangements of optical fiber spans, higher gain repeaters, and lower gain repeaters, a person of ordinary skill in the art will appreciate that higher gain repeater placement and lower gain placement in a cable assembly may be determined by the required characteristics of the individual fiber optic cable spans. Those skilled in the art will recognize that other fiber types with different properties may be used. Although the examples described above show an insignificant impact on system performance at specific gain excursions, those skilled in the art will recognize that other gain excursions may also be possible and may depend upon the system parameters and characteristics.

According to an alternative embodiment, gain tilt may be managed using standard repeaters for a transmission span, higher gain repeaters and added loss such as line-build outs (LBOs). According to this embodiment, the standard (or nominal) repeaters may be designed for the system using current practices where the nominal repeater gain is matched to the nominal span loss. Higher gain repeaters may be designed using the same general components but with a higher gain, for example, with a longer erbium doped fiber (EDF) when EDFAs are used.

Gain tilt may be measured to determine the proper arrangement of standard repeaters, higher gain repeaters and LBOs. If excessive negative gain tilt is accumulated during system assembly, a standard or nominal repeater may be replaced with a higher gain repeater. If excessive positive gain tilt is accumulated during system assembly, loss may be added to one or more spans, for example, by adding one or more LBOs either in the cable/repeater coupling or in a cable-to-cable splice box. By using the higher gain repeaters and LBOs, the gain tilt may be managed without having to shorten the length of the transmission span and without having to use a GEJ. The higher gain repeaters may also be used as the spare repeaters, which may reduce the likelihood of requiring additional repeaters in the wet plant in the event of a deep water repair.

In summary, embodiments of the present inventions provide systems and methods for managing gain tilt in optical systems. Consistent with one embodiment, an optical transmission system includes a plurality of higher gain optical amplifiers and a plurality of lower gain optical amplifiers. The higher gain optical amplifiers each have a higher nominal gain value and the lower optical amplifiers each have a lower nominal gain value lower than the higher nominal gain value. A plurality of optical fiber spans are coupled to the optical amplifiers, and the higher gain optical amplifiers and the lower gain optical amplifiers are arranged to allow a net gain at different points in the optical transmission system to vary within a predetermined acceptable net gain excursion.

Consistent with a further embodiment, an optical transmission system includes a plurality of transmission spans coupled together. Each of the transmission spans has a nominal span loss value and includes a fiber optic cable span and an optical repeater coupled to the fiber optic cable span. The optical repeater in each of the transmission spans has either a higher nominal gain value higher than the nominal span loss value or a lower nominal gain value lower than the span loss value to allow a net gain at different points in the optical transmission system to vary within a predetermined acceptable net gain excursion.

Consistent with yet another embodiment, a method for managing gain tilt in an optical transmission segment includes determining a nominal span loss value for transmission spans in the optical transmission system and providing a plurality of higher gain repeaters each having a higher nominal gain value higher than the nominal span loss value and a plurality of lower gain repeaters each having a lower nominal gain value lower than the nominal span loss value. The higher gain repeaters and the lower gain repeaters are arranged in a transmission segment such that a net gain at different points in the optical transmission segment varies within a predetermined acceptable net gain excursion.

Consistent with a further embodiment, a method of constructing an optical transmission segment includes determining a repeater spacing in an optical transmission segment based on a nominal span loss and nominal repeater gain substantially equal to the nominal span loss. The method also includes providing a plurality of fiber optic cable spans corresponding to the repeater spacing, a plurality of higher gain repeaters each having a higher nominal gain value, and a plurality of lower gain repeaters each having a lower nominal gain value lower than the higher nominal gain value. The repeaters are connected to the fiber optic cable spans to form transmission spans. The higher gain repeaters and the lower gain repeaters are arranged such that a net gain at different points in the optical transmission segment varies within a predetermined acceptable net gain excursion.

Consistent with yet another embodiment, a method of managing gain tilt in an optical transmission segment includes providing an optical transmission segment comprising a plurality of fiber optic cable spans and a plurality of repeaters coupled to the fiber optic cable spans. Gain tilt in the optical transmission segment is monitored. If negative gain tilt is accumulated at a repeater location in the transmission segment, the repeater at the repeater location is replaced with a higher gain repeater having a higher nominal gain value than the nominal gain value of the repeater being replaced.

Accordingly, a relatively small set of repeater codes (i.e., repeater nominal gain values) may be used to support a wide range of capacity, segment length and fiber type requirements, with no additional repeaters and essentially no degradation in system performance. This simplifies the design and manufacturing processes for optical communication systems.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of managing gain tilt in an optical transmission segment, said method comprising:
   providing an optical transmission segment comprising a plurality of fiber optic cable spans and a plurality of repeaters coupled to said fiber optic cable spans;
   monitoring gain tilt in said optical transmission segment; and
   if negative gain tilt is accumulated at a location of a repeater of said plurality of repeaters in said transmission segment, managing said negative gain tilt by replacing said repeater at said repeater location with a higher gain repeater having a higher nominal gain value than said nominal gain value of said repeater being replaced to bring a net gain of said system toward zero.

2. The method of claim 1 further comprising: if positive gain tilt is accumulated, adding at least one line build out (LBO) to at least one of said cable spans.

3. The method of claim 1 further comprising:
   if positive gain tilt is accumulated at a repeater location in said transmission segment, replacing said repeater at said repeater location with a lower gain repeater having a lower nominal gain value than said nominal gain value of said repeater being replaced.

4. The method of claim 1, wherein at least one of said optical fiber spans includes a plurality of fibers spliced together.

5. The method of claim 1, wherein said plurality of repeaters have essentially the same spacing.

6. The method of claim 1, wherein at least one of said plurality of repeaters comprises an erbium doped fiber amplifier.

* * * * *